J. BLAIR, Jr.
COMBINED PNEUMATIC AND STEEL TIRE.
APPLICATION FILED MAR. 7, 1917.

1,252,081.

Patented Jan. 1, 1918.
2 SHEETS—SHEET 1.

WITNESSES

INVENTOR
John Blair Jr.
BY
ATTORNEYS

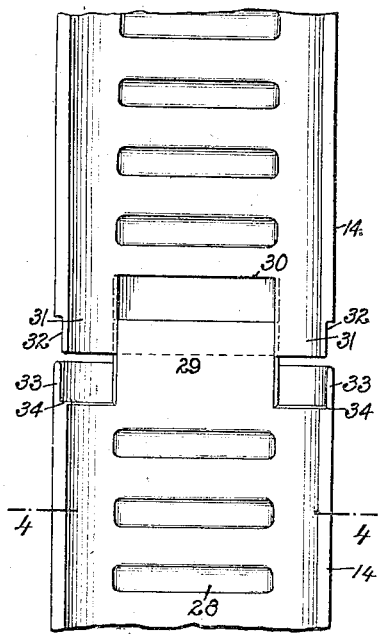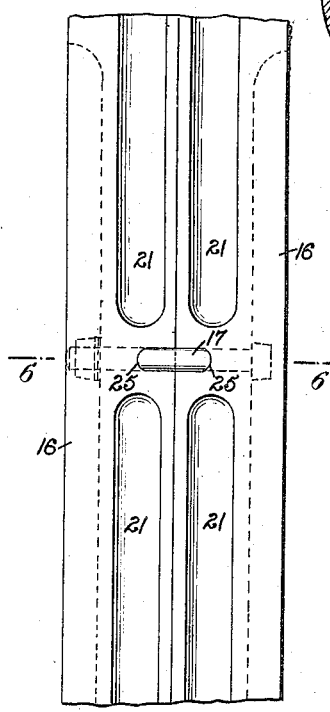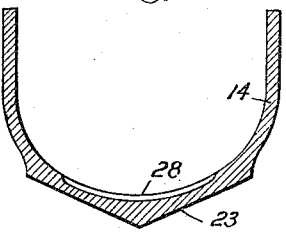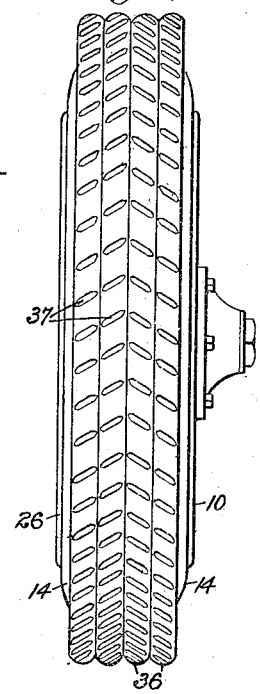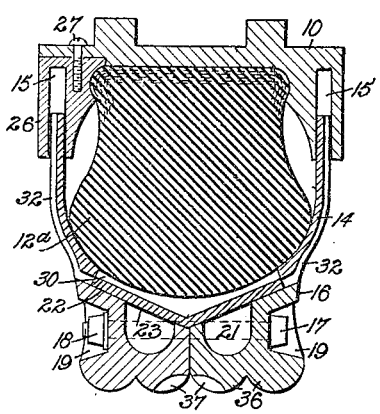

UNITED STATES PATENT OFFICE.

JOHN BLAIR, JR., OF ROCK SPRINGS, WYOMING.

COMBINED PNEUMATIC AND STEEL TIRE.

1,252,081.   Specification of Letters Patent.   Patented Jan. 1, 1918.

Application filed March 7, 1917. Serial No. 152,988.

*To all whom it may concern:*

Be it known that I, JOHN BLAIR, Jr., a citizen of the United States, and a resident of Rock Springs, in the county of Sweetwater and State of Wyoming, have invented a new and Improved Combined Pneumatic and Steel Tire, of which the following is a full, clear, and exact description.

My invention relates to the type of tire in which is comprised a pneumatic inner tube and casing, or an equivalent cushion tire, together with metallic protective elements floatingly sustained in position on a rim by the pressure of the expanded inner tube.

Objects of my invention are to provide a tire of the type referred to in which the protective elements will be afforded freedom of movement in any direction in the plane of the tire relatively to the rim; to prevent injury to the inner tube and its casing, or other inner tire, by the movements of the protective elements; to provide for making a tire of the type referred to readily demountable; to provide protective elements including a floating shell formed of semicircular sections to facilitate the attachment and detachment of the shell, as well as to provide overlapping joints for the sections and so formed as to produce a strong connection between the shell sections; and to provide protective means including annular tread bands with clamping means acting to very firmly secure the tread bands detachably on a floating protective shell and in a manner to effect interlocking engagement between the clamp means and the shell to positively prevent creeping of the tread bands.

The invention also has for its object to provide metallic tread bands of a character suitable for embodying therein effective antiskidding members.

The nature of the invention and its advantages will more clearly appear as the description proceeds.

Reference is to be had to the accompanying drawings forming a part of this specification in which similar reference characters indicate corresponding parts in all the views.

Fig. 3 is a fragmentary developed view showing the inner face of the floating shell;

Fig. 4 is a cross section on the line 4—4, Fig. 3;

Fig. 5 is a view similar to Fig. 3, showing the inner side of the tread bands;

Fig. 6 is a cross section on the line 6—6, Fig. 5;

Fig. 7 is an end elevation of the wheel equipped with my improved tire;

Fig. 8 is a view similar to Fig. 1 but on a reduced scale, illustrating the employment of a cushion tire in lieu of the pneumatic inner tube and its casing.

Figure 1:
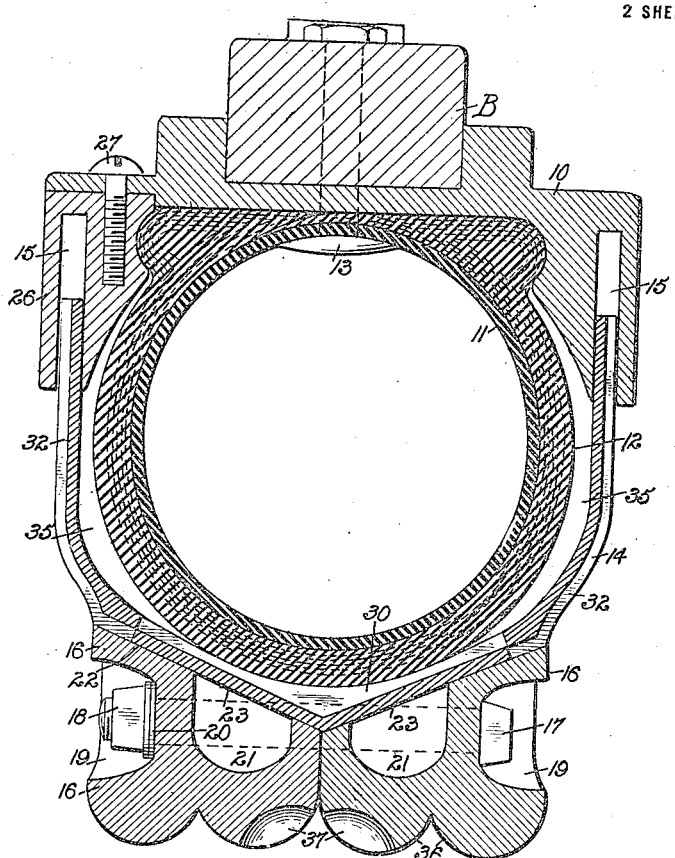
Figure 1 is an enlarged cross section in a plane corresponding with line 1—1, Fig. 2.
Figure 2:
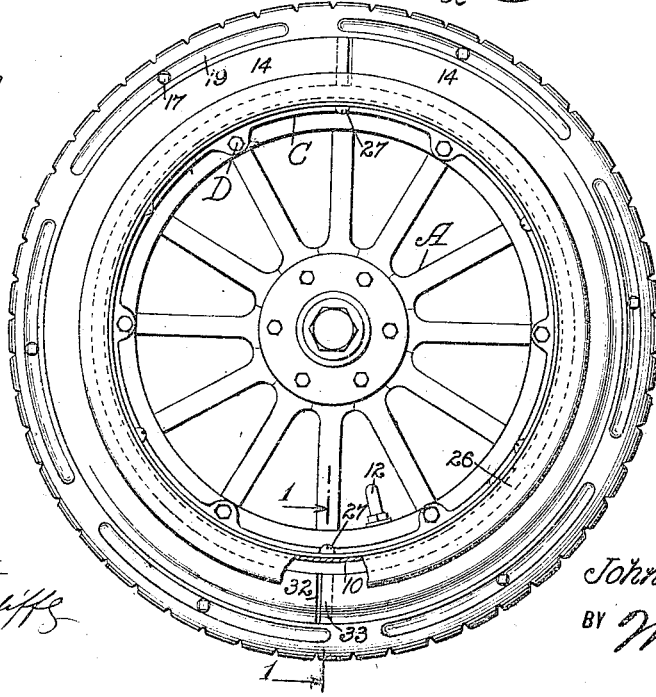
Fig. 2 is a side view of a wheel equipped with my tire, parts being broken away.

In constructing a tire embodying my invention in the form shown in Fig. 1, an inner rim 10 is provided, adapted to be secured in any suitable manner to the rim B of any approved wheel A, there being indicated at C, Fig. 2, a known form of securing means, the letter D, indicating bolts thereof. The numeral 11 indicates an inner pneumatic tube; 12, a casing for said tube; and 13, the air valve. In Fig. 8 a solid cushion inner tire 12ª is shown in lieu of the inner tube and casing.

The rim 10 is formed at each side with an annular channel 15 extending from the outer periphery of the said rim radially inward to near the base of the rim. Surrounding the casing 12 at the periphery and sides is a floating shell 14 formed of two semi-circular sections as hereinafter more particularly referred to. The said shell at the sides presents free annular edges at its inner periphery and is received in the channels 15 with a snug fit to exclude dust and dirt, while not being so tight as to bind in the channels. The arrangement is such that the shell will be floatingly sustained in position by the expanded inner tube and its casing while free to vibrate or oscillate in the plane of the wheel in response to shocks.

On the outer periphery of the shell 14, tread bands 16 of unbroken continuity are received and clamped in position by transverse bolts 17 and nuts 18. The bolt heads and the nuts are received in channels 19 in the sides of the tread bands, said channels serving to thus house and protect the bolt heads and the nuts and at the same time reducing the weight of the tread bands without impairing their strength, it being understood that the said bands and the floating shell are formed of steel in practice. At the inner periphery of each tread band 16, the same is beveled as indicated by the numeral 22 and the said beveled surfaces correspond with the cross section of the shell 14 which is V-shape to present oppositely beveled surfaces 23, the apex of the V being at the median line of the tire. Thus, the tightening of the nuts 18 will draw the tread bands 16 firmly to position by reason of the wedging action produced by the opposed surfaces 22, 23, on said bands and shell. As best seen in Fig. 6, the shell 24 at the apex of its V-shaped periphery has produced therein a transverse notch 24 which is positioned in register with or complementary to the transverse bolt holes 25 in the tread bands, whereby a positively interlocked engagement is effected between the bolts 17 and the shell 14 to thereby prevent creeping of the tread bands on the shell. The numeral 20 indicates a washer employed beneath each nut 18, and the numeral 21 indicates recesses in the inner periphery of each tread band 16.

Advantageously one of the annular channels 15 in the rim 10 is produced in a separate detachable ring member 26 constituting a side of said rim, said ring 26 being held in position by screws 27 or the like. The arrangement serves to facilitate the mounting and demounting of the tire or the renewal or repair of the inner tube or its casing.

The shell sections 14 have transverse recesses or depressions 28 at the inner face of the shell, whereby the casing 12 will be expanded by the air pressure of the inner tube to effect inter-engagement between the outer surface of said casing and the shell 14, and assist in preventing creeping of the shell on the casing. In order to effect a strong connection between the shell sections 14, a broad central tongue 29 is produced on one shell at each joint, said tongue being adapted to overlap the adjacent end of the other shell section, the latter being formed with a depression or recess 30 to receive the said tongue. Also, that end of a section having the depression 30 has side members which overlap the adjacent side members 33 of the other sections, there being recesses or depressions 32 in the side members 31 at the outer side and depressions 34 in the members 33 at the inner side of the shell sections to produce a flush overlapped joint at the sides of each tongue 29.

It will be observed from Figs. 1 and 8 that the overlapping joint members extend to the inner periphery of the shell sections, the depressions 32 and the mating members therein being continued to the inner edges of the shell so that the overlapped portions are received and accommodated in the channels 15, the channeled rim thereby assisting in retaining the joint members against displacement.

The numeral 35, Fig. 1, indicates a space which is produced within the shell 35ª at each side of the casing 12 due to the fact that the casing presents a rounded exterior surface at the sides and periphery, while the shell 14 at the inner periphery has a curvature of greater radius than the casing, the curved surface of the shell merging into the straight side portions of the shell. The arrangement is designed to prevent any damaging contact between the shell and the casing by sudden shocks or jars.

The steel tread bands 16 lend themselves to production of a non-skidding formation thereon, for which purpose each band 16 is produced with annular beads 36, and in said bands oblique recesses or depressions 37 are produced.

I wish to state in conclusion that although the illustrated example constitutes a practical embodiment of my invention, I do not limit myself strictly to the mechanical details herein illustrated, since manifestly the same can be considerably varied without departure from the spirit of the invention as defined in the appended claim.

Having thus described my invention, I claim as new, and desire to secure by Letters Patent:

In a tire of the class described employing a resilient inner tire and protective means therefor; a shell adapted to cover the inner tire at the sides and periphery, said shell being formed of semi-circular sections, the one section presenting a broad central tongue, and the opposed end of the other section having a depression to receive said tongue, the said opposed ends of the sections at the sides of the tongue and depression presenting overlapping rabbeted tongues; together with a rim on which said tire is seated, said rim being formed with annular channels receiving the side edges of the said shell, the overlapped side members of the said shell being accommodated in said channels.

JOHN BLAIR, JR.